May 14, 1968 R. W. MILER 3,383,015
APPARATUS AND METHODS FOR DISPENSING MATERIALS FROM A MIXER
Filed Dec. 5, 1966 5 Sheets-Sheet 1

INVENTOR.
RICHARD W. MILER
BY
Learman, Learman & McCulloch
ATTORNEYS

INVENTOR.
RICHARD W. MILER

May 14, 1968    R. W. MILER    3,383,015
APPARATUS AND METHODS FOR DISPENSING MATERIALS FROM A MIXER
Filed Dec. 5, 1966    5 Sheets-Sheet 5

INVENTOR.
RICHARD W. MILER
BY
*Learman, Learman & McCulloch*
ATTORNEYS

United States Patent Office 3,383,015
Patented May 14, 1968

3,383,015
APPARATUS AND METHODS FOR DISPENSING MATERIALS FROM A MIXER
Richard W. Miler, Saginaw, Mich., assignor to Baker Perkins Inc., Saginaw, Mich., a corporation of New York
Continuation-in-part of application Ser. No. 503,664, Oct. 23, 1965. This application Dec. 5, 1966, Ser. No. 599,015
21 Claims. (Cl. 222—1)

ABSTRACT OF THE DISCLOSURE

Methods and apparatus for mixing or extruding synthetic plastic materials wherein part of the material stream advanced axially in a fluid state is divided off and later is introduced to a chamber portion in which the stream is introduced from an opposite direction so that the divided off portion and stream are joined again at a radial discharge port and issue therefrom in a steady stream.

---

This application is a continuation-in-part of application Ser. No. 503,664, filed Oct. 23, 1965, now abandoned.

This invention relates to the continuous mixing or extruding of plastic materials and the like to form a homogeneously blended mass and more particularly the invention pertains to apparatus and methods for dispensing the materials at a substantially uniform rate.

Apparatus and methods according to one embodiment of the invention are particularly adapted for use in the mixing and blending of plastic and similar substances which are blended to a predetermined homogeneity and discharged from a mixer in pulses at the proper temperature and pressure. A mixer of the kind with which the one embodiment of the instant invention is adapted for use is disclosed in United States Patent No. 3,023,455, granted Mar. 6, 1962, and to which reference may be had for a more detailed disclosure of the mixer apparatus.

An object of the invention is to provide methods and means for receiving material from a mixer or extruder and dispensing such material at a substantially uniform, continuous rate.

A further object of the invention is to provide dispensing apparatus of the character described wherein the dispensed material may be maintained at a temperature which is substantially that of the material in the mixer or extruder.

Another object of the invention is to provide mixing apparatus of the kind referred to and in which the dispensing means may be driven by the same means which drives the mixing or extruding apparatus.

A further object of the invention is to provide mixing apparatus such as has been described and wherein the mixing and kneading of the material is continued during the dispensing thereof.

Another object of the invention is to provide dispensing apparatus for various mixing and extruding machines and having heat exchange capabilities for controlling the temperature of the dispensed material.

A further object of the invention is the provision of dispensing apparatus as described which is so constructed as to facilitate cleansing of the parts.

Other objects and advantages of the invention will be pointed out specifically or will become apparent from the following description when it is considered in conjunction with the appended claims and the accompanying drawings, in which:

Figure 1:
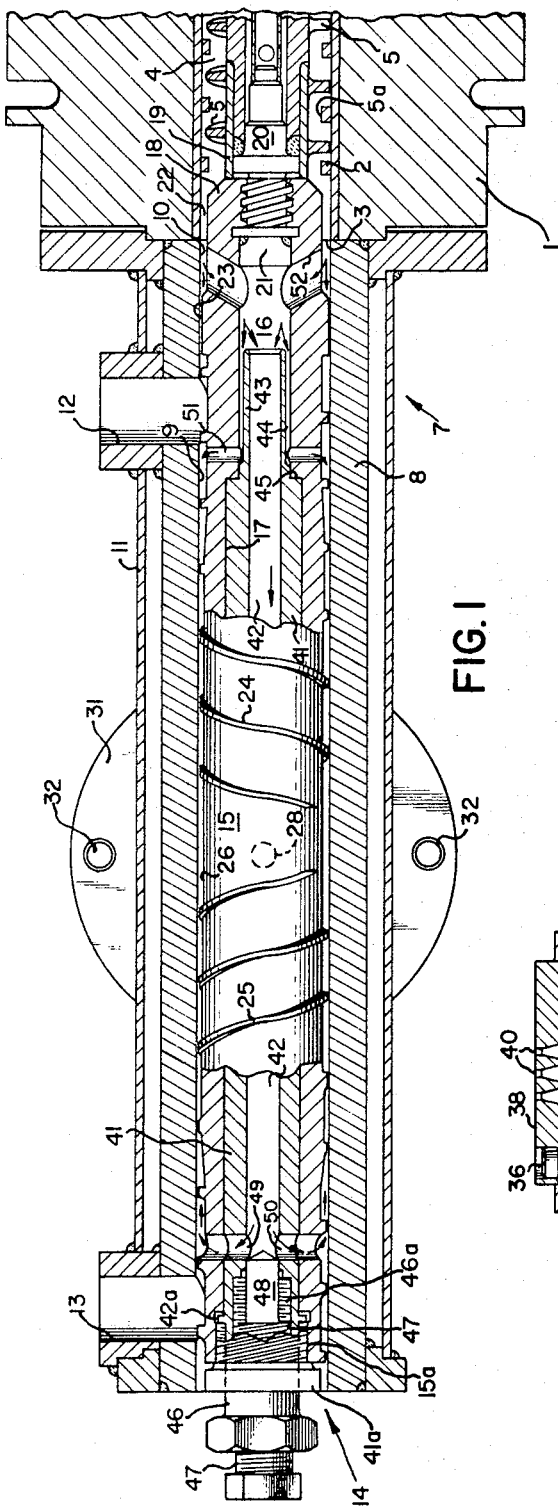
FIGURE 1 is a longitudinal sectional view through dispensing apparatus constructed in accordance with one embodiment of the invention and illustrating its association with a mixer.
Figure 2:
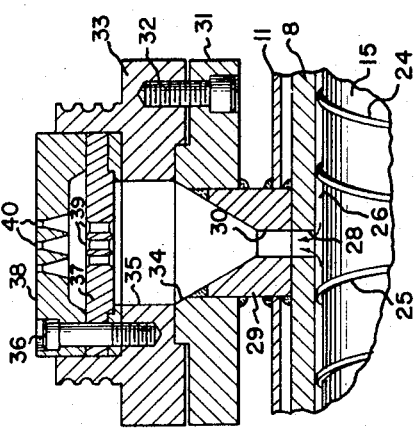
FIGURE 2 is a fragmentary sectional view illustrating the discharge opening of the dispensing apparatus.

Apparatus constructed in accordance with the embodiment of the invention shown in FIGURES 1 and 2 is adapted for use in conjunction with a mixing machine of the kind disclosed in the aforementioned patent and which includes a barrel 1 having a longitudinally extending mixing chamber 2 terminating at one end in a discharge opening 3. Within the chamber 2 is a mixing and forwarding screw 4 which is rotated by means of an electric motor (not shown), and reciprocated by a cam assembly (not shown) as is more fully explained in the aforementioned patent. The screw 4 has interrupted helical blades 5 thereon which cooperate with lugs 5a provided on the chamber wall and mix and knead materials in the chamber 2 while advancing the materials through the mixing chamber to the discharge end 3 whence the blended material is discharged in pulses in accordance with the reciprocation of the screw 4.

Dispensing apparatus formed according to the embodiment of the invention shown in FIGURES 1 and 2 is designated generally by the reference character 7 and comprises an elongated housing or receptacle 8 which is longitudinally bored as at 9 to form a chamber having an inlet end 10 fixed to the barrel 1 in register with the discharge opening 3 of the mixer. The housing 8 preferably is surrounded by a jacket 11 through which a heat exchange medium may be circulated and both the housing 8 and the jacket 11 are provided with openings adjacent opposite ends thereof providing vents 12 and 13 through which volatile substances may escape.

A dispensing member generally designated 14 is accommodated in the chamber 9 for dispensing material introduced to the latter. The dispensing member comprises an elongated, rod-like screw member 15 which is longitudinally bored as at 16 and 17. At one end the member 15 terminates in a plug-like part 18 which extends at least partially into the chamber 2 of the mixer 1 so as to abut the adjacent end of the mixing screw 4. Means is provided for rotating and reciprocating the dispensing member 15 in response to rotation and reciprocation of the mixer screw 4 and comprises a coupling member 19 having a shank 20 which is welded or otherwise suitably fixed to the screw 4 and a threaded extension 21 which is accommodated in the correspondingly threaded end of the bore 16 of the part 18.

The external diameter of the part 18 is somewhat less than the internal diameter of the bores 2 and 9 so as to provide an annular space 22 around the part 18. At a point axially spaced from the part 18, the member 15 is provided with a shoulder 23 having a sliding fit with the bore 9. From the shoulder 23 and extending axially of the member 15 is a helical vane or flight 24 which terminates at a zone substantially midway between the vent openings 12 and 13. Formed on the member 15 and extending from the opposite end thereof is a second helical vane or flight 25 which also terminates at a zone substantially midway between the vent openings 12 and 13. The diameters of the flights 24 and 25 correspond to each other and have a sliding fit with the bore 9. The flights, with the shoulder 23, mount the member 15 concentrically within the housing 8 for movements relative thereto and provide an annular chamber 26 between the member 15 and the housing 8. The pitch or hand of the flights 24 and 25, however, is opposite, the pitch of the flights being such that, upon rotation of the member 15, material to the right of the zone of termination of the flight 24 will be propelled toward the zone, and material to the left of the zone of termination of the flight 25 will be propelled toward the zone.

In communication with the annular chamber 26 and located at the zone of termination of the flights 24 and 25 is an outlet opening 28 (see FIGURE 2) formed in the housing 8. Fixed to the housing 8 and surrounding the outlet 28 is a block 29 having a passage 30 therein in communication with the outlet 28. Fixed to the block 29 is a mounting flange 31 to which may be secured by screws 32 or the like a die ring 33. The plate 31 has an opening 34 therein which merges with the passage 30 in the block 29, and the die ring 33 has an opening 35 in register with the opening 34. Secured by screws 36 or the like to the die ring 33 are die plates 37 and 38 having expressing orifices or ports 39 and 40, respectively, therein.

As has been stated earlier, the dispensing member 15 is longitudinally bored at 16 and 17. Positioned within the member 15 is a sleeve 41 having a bore therethrough forming a passage 42. At one end of the sleeve 41 is a radially reduced extension 43 which extends into the bore 16, the extension being of such size as to provide an annular passage 44 between itself and the surface of the bore 16. Between the extension 43 and the main body of the member 41 is a shoulder 45 which abuts the seat formed by the juncture of the bores 16 and 17. At the opposite end of the sleeve 41 is an externally threaded nut 41a that is threaded into the correspondingly threaded bore 15a at the end of the member 15 and bears against a flange 42a to maintain the sleeve 41 fixed relative to the member 15. The left hand end of the member 41 terminates in an extension 46 that is internally threaded as at 46a to accommodate a threaded shaft 47 which terminates at its inner end in a blunt-nosed valve or plug member 48 which is axially adjustable relatively to the member 41.

Adjacent the valve 48 the member 41 is provided with radial ports 49 which communicate with correspondingly located ports 50 formed in the member 15 so as to provide communication between the passage 42 and the chamber 26. Adjacent the extension 43, the member 15 also is providing with radial ports 51 which provide communication between the bore 16 and the chamber 26. Communication between the bore 16 and the annular space 22 at the inlet end of the housing is provided by generally radially extending ports 52 in the member 15.

In the operation of the apparatus thus far described, materials contained in the mixing chamber 2 are blended and kneaded by the continuously rotating and reciprocating mixer screw 4 and the material is discharged from the discharge end 3 of the chamber 2 into the inlet 10 of the dispensing apparatus 7. Material introduced to the inlet 10 will pass partly through the ports 52 into the bore 16 and partly around shoulder 23 into chamber 26. As further material is introduced to the dispensing apparatus, the previously introduced material will move axially to the left. Part of this material will be diverted to the annular space 44, whereas the remainder of the material will enter the passage 42.

Material introduced to the space 44 will pass through the ports 51 into the chamber 26 so as to be driven to the left by the flights 24 in response to clockwise rotation of the member 15. Material introduced to the passage 42 will be deflected by the valve 48 through the ports 49 and 50 into the chamber 26, but at the left-hand end of the dispensing apparatus 7. Such material will be advanced to the right by the flights 25 upon clockwise rotation of the member 15.

The material in the chamber 26 will be advanced toward the zone of the outlet 28 from opposite ends of the housing 8 and will be discharged through the opening 28 to the passages 30, 34 and 35, whence it will be expressed through the die orifices 39 and 40 so as to be cut into pellets, if desired, by rotating knives (not shown).

An important characteristic of the invention is that, regardless of the direction of reciprocation of the advancing member 15, material to be dispensed will be advanced toward the zone of the discharge opening 28 upon each stroke of the mixer member 4. Moreover, material will be advanced toward that zone by the continuously rotating flights 24 and 25. Consequently the discharge of material from the dispenser 7 is continuous rather than pulsating.

The valve 48 may be adjusted by manipulation of the screw 47 externally when the apparatus is stopped. Should the valve 48 be shifted, the flow of material through the passages 49 and 50 will be affected and this control permits the operator to balance the flow through ports 49–50 and 51 in the desired manner. Also, rotation of member 41 from a position in which the ports 49 and 50 are fully open to a position in which they are partly closed creates a back pressure which permits the operator to control the rate of discharge of material from the mixer. Thus, control of the viscosity and temperature of materials discharged from the mixer can be maintained by adjusting member 41.

Figure 3:
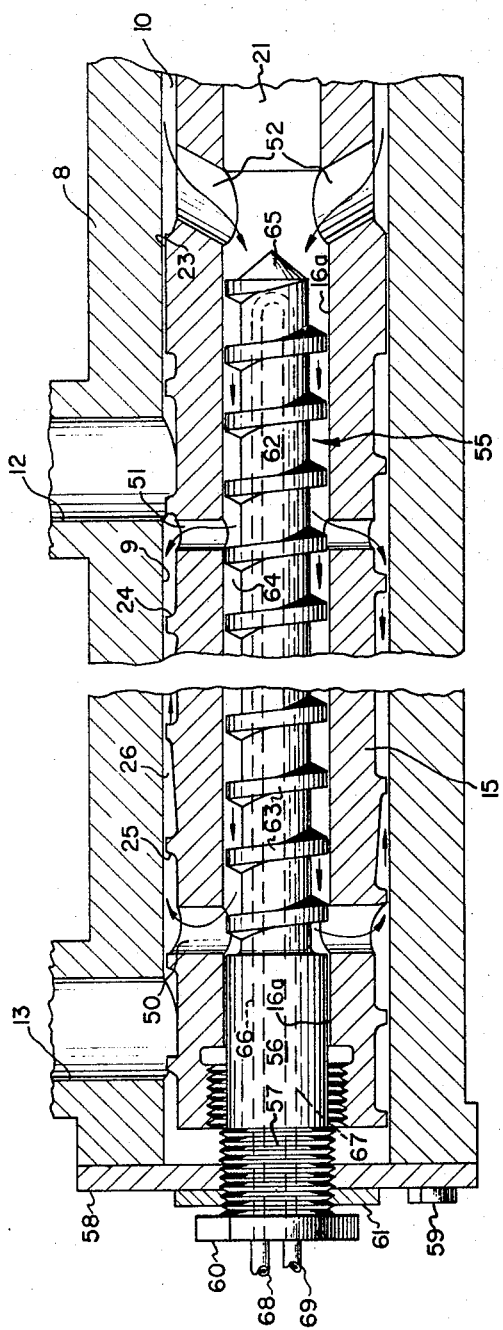
FIGURE 3 is a view similar to FIGURE 1, but illustrating a modified form of the invention.

The apparatus disclosed in FIGURE 3 is similar to that previously described and corresponding reference characters identify corresponding parts. The principal difference between the two embodiments lies in the interior construction of the screw member 15 and the apparatus accommodated therein.

In the embodiment shown in FIGURE 3, the screw 15 has an axially extending bore 16a of uniform diameter and in which is accommodated with a sliding fit a stationary screw member 55. At one end of the screw 55 is an enlargement 56 slideably accommodated in the bore 16a and terminating in a threaded portion 57 which is threaded into a correspondingly threaded opening formed in a plate 58 that is secured to the end wall of the housing 88 by suitable means such as bolts 59. A head 60 is secured to the threaded portion 57 to facilitate axial adjustment of the screw 55 and the latter may be maintained in a selected position of adjustment by a jam nut 61.

The screw 55 includes an elongated reduced diameter shank portion 62 that is joined to the enlarged portion 56 and on which is a helical thread or flight 63 of constant pitch and hand. The periphery of the flight 63, together with the periphery of the shank portion 62, forms in the bore 16a a helical passage 64 extending substantially the full length of the bore 16a. The free end of the shank portion 62 terminates in a blunt nose 65 adjacent the passages 52.

In the operation of the apparatus shown in FIGURE 3, the screw 15 is reciprocated in the manner hereinbefore described so as to enable material from the mixer to be introduced to the bore 16a via the passages 10 and 52. Material introduced to the bore 16a is admitted to the helical passage 64 and, as the screw 15 rotates and reciprocates relatively to the fixed screw 55, the material in the passage 64 is further mixed and kneaded.

As material in the passage 64 advances toward the left, as viewed in FIGURE 3, some of the material will be diverted to the chamber 26 via the ports 51 and subsequently discharged through the outlet opening 28. The remainder of the material in the passage 64 will be delivered to the chamber 26 via the ports 50 whence it will be delivered to the outlet opening 28.

By axial adjustment of the screw 55, the amount of material introduced to the chamber 26 via the ports 50 may be varied and a back pressure created so as to control the viscosity and temperature of materials discharged from the mixer.

In some instances, it may be desirable to introduce a heat exchange medium to the interior of the screw 55 so as to effect heating or cooling of the material being dispensed. For this purpose, the screw 55 may include circulating passages 66 and 67 communicating with inlet and outlet tubes 68 and 69 extending through the head 60 and being connected to a source of heating or cooling fluid.

Figure 4:
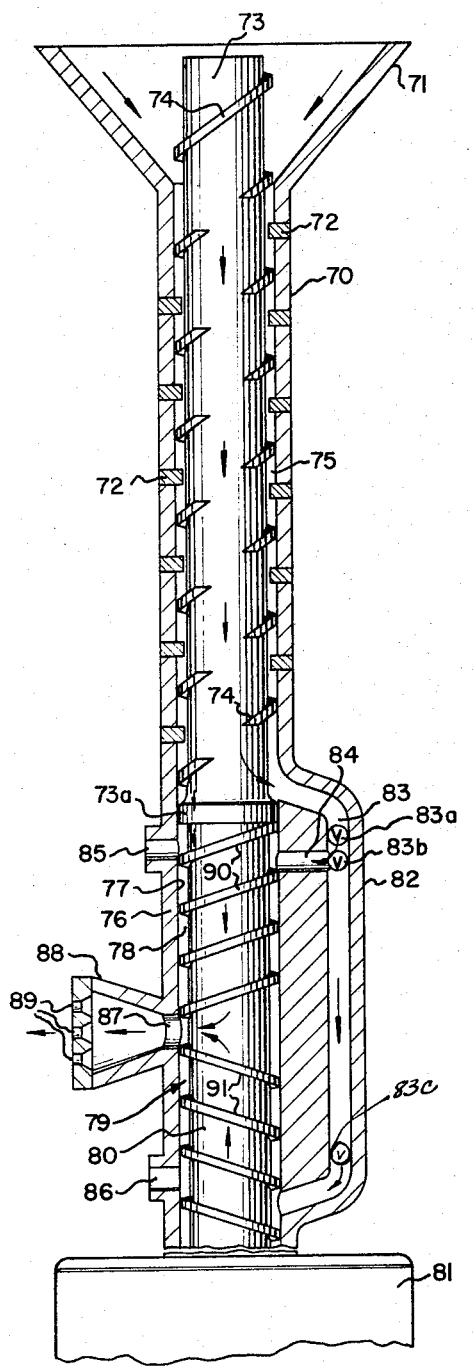
FIGURES 4, 5 and 6 are views similar to FIGURE 3 but illustrating still further embodiments of the invention.

The embodiment shown in FIGURE 4 is a vertical mixing and dispensing apparatus comprising a stationary barrel member 70 terminating at one end in an inlet hopper 71 by means of which materials to be kneaded and dispensed may be introduced to the interior of the barrel. Axially spaced lugs 72, similar to the lugs 5a, project inwardly from the inner surface of the barrel 70.

Rotatably and reciprocably mounted in the barrel 70 is a screw member 73 having a helical vane 74 adapted to feed material from the hopper 71 to the interior of the barrel 70. The vane 74 is interrupted at intervals axially of the screw member 73 to avoid interference with the lugs 72. An annular space or chamber 75 exists between the screw member 73 and the barrel 70 in which the material in the latter is kneaded, mixed and blended during rotation and reciprocation of the screw member 73.

The barrel 70 terminates adjacent its lower end in a housing 76 having a smooth, axially extending bore 77 providing a chamber 78 in prolongation of the space 75. Rotatably and reciprocably accommodated in the bore 77 is a dispensing member 79 comprising a screw shaft 80 which is joined at its upper end to the screw member 73 and which is connected at its lower end to rotating and reciprocating mechanism located in a housing 81 and corresponding to the driving mechanism disclosed in the aforementioned patent. At the juncture of the screw members 73 and 80, the screw member 73 has an enlarged flange 73a which is in sliding engagement with the inner surface of the barrel 70.

The housing 76 has an enlargement 82 extending to one side thereof and in which is a bypass 83 that communicates at its opposite ends with the space 75 and with the lower end of the chamber 78, respectively. A radial port 84 communicates between the passage 83 and the chamber 78 adjacent the upper end of the latter. A conventional valve 83a is provided upstream of port 84 and a second conventional valve 83b is provided at port 84. A valve 83c is operable in the same manner as the valve 48 in FIGURE 1 to achieve the control desired. On the opposite side of the housing 76, there are upper and lower vent passages 85 and 86, respectively, and substantially midway between the vent passages is a discharge opening 87 which is surrounded by a housing 88 in which are expressing orifices 89.

Carried by the screw member 80 is a helical vane 90 which extends from the upper end of the member 80 to a point adjacent the discharge opening 87. Also carried by the member 80 is a helical vane 91 which is opposite in hand to the hand of the vane 90 and which extends from adjacent the discharge opening 87 to the lower end of the housing 76. The vanes 90 and 91 are similar to the vanes 24 and 25, respectively.

In the operation of the apparatus shown in FIGURE 4, material introduced to the funnel 71 is advanced longitudinally of the barrel 70 and is mixed and kneaded in response to rotation and reciprocation of the screw member 73. At the upper end of the housing 76, the material is introduced to the passage 83. A portion of the material is diverted from the passage 83 through the port 84 into the chamber 78 adjacent the upper end of the latter, and the remainder of the material in the passage 83 is introduced to the chamber 78 adjacent the lower end thereof. As the screw member 80 reciprocates and rotates, the vane 90 will feed material from the chamber 78 to the discharge opening 87 and the vane 91 will feed material from the chamber 78 to the discharge opening 87 so as to effect a uniform discharge of the material through the orifices 89. The thrusts on shaft 73 tend to be balanced by the construction described. Valve 83a controls back pressure in the mixer section and valve 83b controls the material flow through port 84 to screw section 90. Valve 83c controls the flow to the lower end of screw shaft 73.

Figure 5:
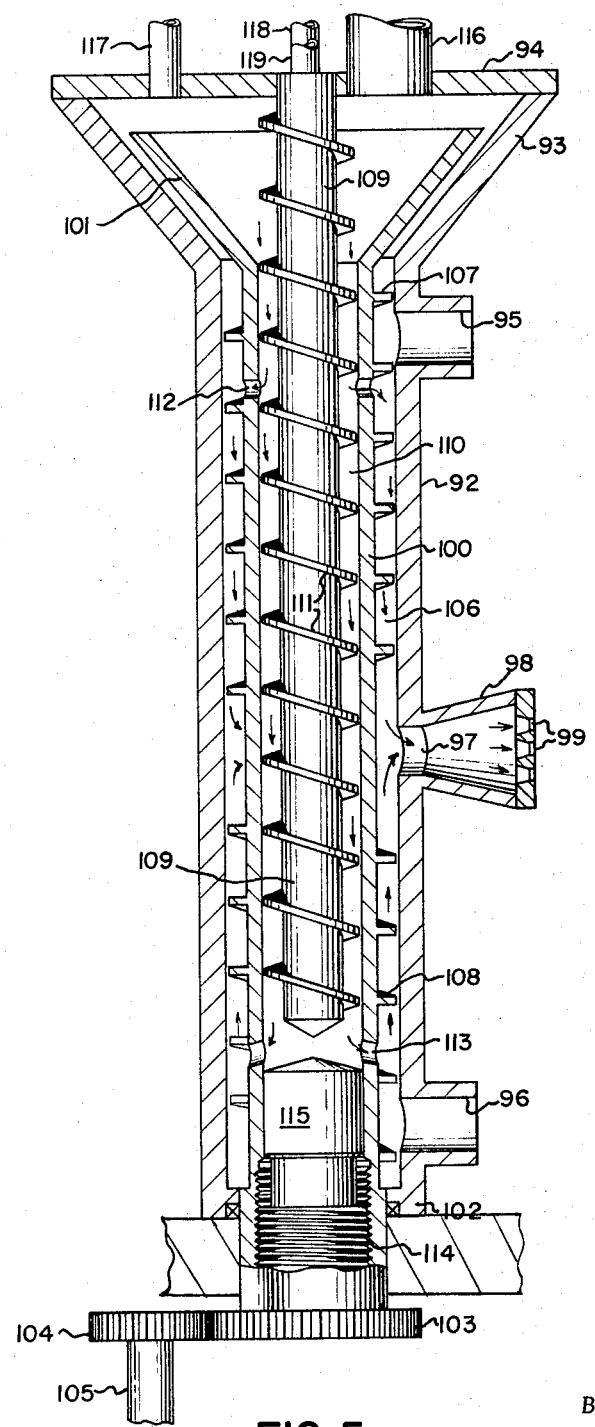

The apparatus shown in FIGURE 5 also is a vertical extruding and dispensing apparatus and comprises a tubular barrel 92 having at its upper end an outwardly flared wall 93 to which is secured in any suitable manner an end plate or cover 94. The bore of the housing 92 is smooth and the housing is provided with upper and lower vent openings 95 and 96, respectively, for the emission of volatiles, substantially midway between which is a discharge opening 97 surrounded by a housing 98 provided with expressing orifices 99.

Rotatably mounted in the housing 92 is a tubular barrel member 100 terminating at its upper end in a funnel-like hopper 101 which is accommodated within the flared wall 93. The lower end of the barrel 100 extends through the bottom wall 102 of the housing 92 and is secured to a driven member such as a gear 103 which may be driven by a pinion 104 fixed to the shaft 105 of a motor (not shown) or other prime mover.

The diameter of the barrel 100 is less than that of the inner surface of the housing 92 so as to provide an annular chamber 106 therebetween. Secured to the outer surface of the barrel 100 is a helical vane 107 which extends in the chamber 106 from adjacent the upper end of the barrel to a point adjacent the discharge opening 7. A similar vane 108 also is secured to the barrel 100 and extends from adjacent the lower end of the latter to a point adjacent the discharge opening 97. The pitch of the vane 107 corresponds substantially to the pitch of the vane 108, but the hand of the two vanes is opposite.

Fixed in the cover plate 94 and extending into the barrel 100 is a screw shaft 109. Between the shaft 109 and the inner surface of the barrel 100 is an annular chamber 110. Secured to the shaft 109 in the chamber 110 is a helical vane 111. Communication between the chambers 106 and 110 is provided adjacent the upper end of the barrel by ports 112 in the barrel, and ports 113 adjacent the lower end of the barrel also provide communication between the chambers 106 and 110.

The lower end of the barrel 100 is interiorly threaded to accommodate a correspondingly threaded shaft 114 terminating at its inner end in a blunt plug member 115 which closely but slideably fits within the barrel 100. Rotation of the shaft 114 effects movement of the member 115 so as to adjust the effective size of the ports 113.

Mounted in the cover wall 94 is an inlet tube 116 by means of which materials to be mixed and dispensed may be introduced to the hopper 101. A vent pipe 117 also may be mounted in the cover 94 and, if desired, inlet and outlet tubes 118 and 119 may extend externally of the cover 94 so as to provide for the circulation of a heat exchange medium through passages formed in the shaft 109.

In the operation of the apparatus, the barrel 100 is rotated, but the members 92 and 109 remain stationary. Material introduced to the hopper 101 is acted on by the vane 111 due to the relative rotation of the members 100 and 109 so as to move the material downwardly in the chamber 110. A portion of the material, such as one half, will be diverted from the chamber 110 into the chamber 106 via the ports 112, whereas the remainder of the material in the chamber 110 will be delivered to the chamber 106 via the ports 113. As the barrel 100 rotates, the vanes 107 and 108 will feed material in the chamber 106 in opposite directions toward the discharge opening 96 whence it will be discharged through the housing 98 and the orifices 99.

Figure 6:
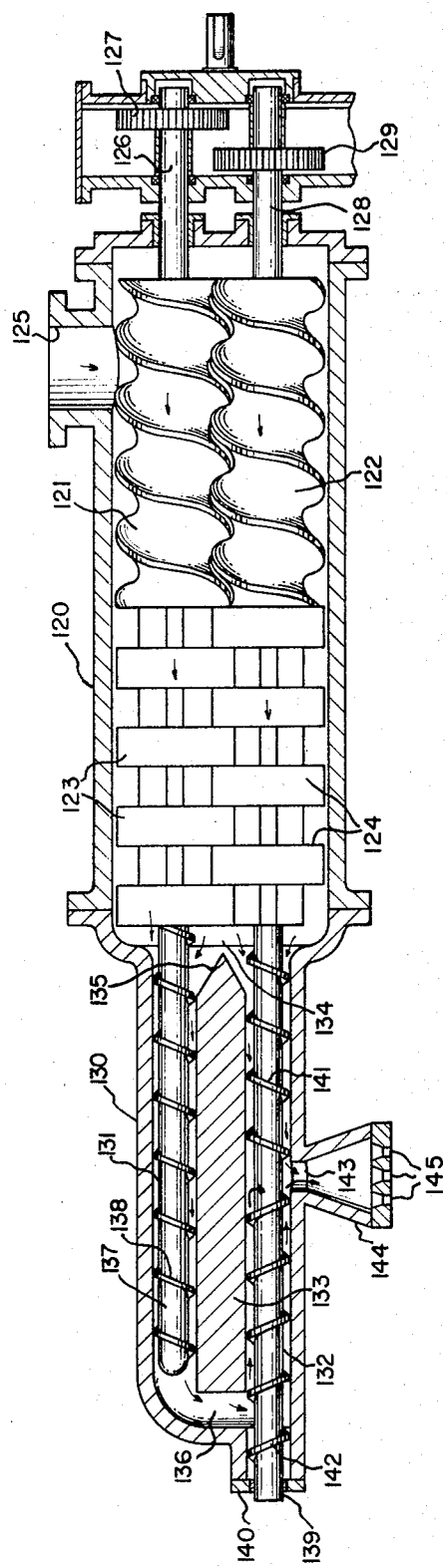

The apparatus disclosed in FIGURE 6 is similar in many respects to that disclosed in United States Patent No. 3,198,491 and includes a tubular housing or barrel 120 within which are mounted rotatable, spiral screws 121 and 122 and two series of radially engaging mixing and kneading paddles 123 and 124. In communication with the interior of the housing 120 is an inlet opening 125 by means of which material to be mixed and kneaded may be admitted to the housing. The screw 121 and the downstream paddles 123 are mounted on a shaft 126 which is driven by a gear 127, and the screw 122 and the downstream paddles 124 are mounted on a shaft 128 driven by a gear 129. The direction of rotation of the respective screws and paddles is such as to feed material from the inlet opening 125 toward the opposite end of the housing 120.

At the outlet end of the housing 120 is secured a housing 130 in which there are two axial, annular passages 131 and 132 separated from one another by an annular partition 133. The end of the partition 133 which is adjacent the discharge end of the housing 120 terminates short of the corresponding end of the housing 130 so as to provide an inlet chamber 134 in which material discharged from the housing 120 may be received. The end of the partition 133 adjacent the chamber 134 is tapered as at 135 so as to deflect material from the chamber 134 into each of the passages 131 and 132. The opposite end of the partition 133 terminates short of the corresponding end of the housing 130 so as to provide a communicating passage 136 between the passages 131 and 132.

Rotatably mounted in the passage 131 is a shaft 137 which is joined to the shaft 126 for rotation thereby and on which is secured a helical vane 138. Rotatably mounted in the passage 132 is a similar shaft 139 which is fixed at one end to the shaft 128 for rotation thereby and which may be journaled at its opposite end in an end wall 140 secured to the housing 130. Secured to the shaft 139 is a pair of vanes 141 and 142. The vane 141 extends from the chamber 134 to a point adjacent a discharge opening 143 formed in the housing 130 between the ends of the latter, and the vane 142 extends from adjacent the passage 136 to a point adjacent the discharge opening 143. The pitch of the vanes 141 and 142 preferably is the same, but of opposite hand. The discharge opening 143 is surrounded by a housing 144 in which is provided a plurality of orifices 145.

In the operation of the apparatus shown in FIGURE 6, material in the housing 120 is mixed, kneaded and discharged to the chamber 134 whence it is diverted to the two passages 131 and 132. Material diverted to the passage 131 from the chamber 134 is advanced to the passage 136 whence it is directed to the passage 132 and is conveyed to the discharge opening 143 by the vane 142. Material introduced to the passage 132 directly from the chamber 134 is conveyed to the discharge opening 143 by the vane 141. As in the other embodiments, divided off portions of the material are advanced to the discharge opening 143 from opposing directions and a steady and continuous discharge through ports 145 is assured. Also, as with the other embodiments, the machine has a greater output than could be achieved with a conventional mixer having an advancing screw of comparable length, eliminates the need for expensive outboard bearing and sealing means at the outlet end, and has a greater venting capacity.

The disclosure is representative of presently preferred methods and apparatus, but is intended to be illustrative rather than definitive of the invention. The invention is defined in the claims.

I claim:

1. Extruding apparatus comprising: means forming a chamber adapted to receive and dispense material and having an inlet and a radial outlet located at a spaced distance therefrom; pressurizing means introducing a stream of said material through said inlet; material advancing shaft means in said chamber for advancing material in a first flow from said inlet toward said outlet; said outlet including a plurality of extruding ports; and means provided between the inlet and outlet for dividing off a portion of material on its way toward said outlet and moving it to said outlet in a second flow opposed to said first flow for discharge therewith out said outlet.

2. Apparatus as set forth in claim 1 wherein said means for moving a portion of said material in a second flow opposed to said first flow comprises opposite hand flight means on a portion of said shaft means on the opposite side of said outlet from said inlet.

3. Apparatus as set forth in claim 1 wherein rotating mixer shaft means is connected with said shaft means.

4. Apparatus as set forth in claim 1 wherein said advancing shaft means comprises at least a pair of shafts with radially engaging paddles thereon; and said dividing off means comprises an axially disposed partition between said shafts downstream of said paddles and dividing the chamber for a portion of its length into separate portions.

5. Apparatus as set forth in claim 4 wherein said shafts have extension portions projecting into said separate chamber portions and said outlet is radially offset from the side of one of said chamber portions; one of said shaft extension portions having flights on one side of the outlet pitched to move material to the outlet from a downstream portion of said one chamber portion and also having flights of opposite hand on another side of said outlet; said other shaft extension portion having flights thereon moving the material through said other chamber portion to said flights of opposite hand.

6. Apparatus as set forth in claim 1 wherein said shaft means includes a first section having material advancing flights of one hand moving the material toward the outlet in a first section of said chamber means, and a second section with flights of opposite hand thereon in a second section of said chamber means on the opposite side of said outlet from said first section; and said dividing off means comprises a bypass extending outside said chamber to connect said first section of the chamber means with said second section thereof.

7. The combination defined in claim 6 wherein valve means is provided in said bypass to selectively restrict or increase the flow of material therethrough.

8. Apparatus for extruding flowable plastic and like materials comprising: relatively movable shaft and shaft housing means including advancing elements for advancing a stream of material under pressure in said housing means; chamber means adjacent thereto having a side outlet between its ends; means upstream of said side outlet for dividing off a flow portion of said stream and introducing it to one end of said chamber means while at least another portion of said stream is advanced to the other end of said chamber means so that said flow portion and stream portion are rejoined at said outlet and issue in a steady stream therefrom; and means for controlling the temperature of said material to maintain it in an extrudable state.

9. Apparatus as set forth in claim 6 wherein said shaft has flight means thereon and is revolved and reciprocated.

10. Apparatus as set forth in claim 8 wherein adjustable means is provided in the path of the material divided off for selectively increasing or restricting the passage thereof.

11. The apparatus set forth in claim 8 wherein volatile vent means are provided in said chamber means for both said first and second flows of material.

12. Material handling apparatus comprising: means forming a chamber adapted to receive and dispense material and having an inlet and an outlet located at a spaced distance therefrom; material advancing shaft means in said chamber for advancing material in a first flow from said inlet toward said outlet; means provided in said chamber for dividing off a portion of material on its way toward said outlet and moving it to said outlet in a second flow opposed to said first flow for discharge therewith out said outlet; said shaft means being tubular to define an inner chamber and a shaft with advancing flights being provided therein; flight means of opposite hand being provided on the exterior of said tubular shaft means on opposite sides of said outlet in said chamber means; passage means connecting said chamber means with said inner chamber upstream from said outlet; and passage means connecting the inner chamber with said chamber means on the opposite side of said outlet.

13. A method of dispensing materials advanced by a mixing or extrusion shaft comprising: advancing the material in a fluid state stream under pressure; dividing said material and introducing separated portions of it to opposite ends of a chamber having an outlet between its ends; and feeding said portions simultaneously in opposite directions toward said outlet.

14. The method set forth in claim 13 wherein all of the materials discharged are delivered to one end of said chamber and wherein such materials are divided near said one end.

15. The method set forth in claim 13 wherein said materials are fed from said opposite ends of said chamber by the application of combined linear and rotary forces.

16. The method set forth in claim 13 including effecting heat exchange of said materials as they are introduced to said chamber.

17. The method set forth in claim 13 wherein the amount of material delivered to at least one end of the chamber may be varied.

18. A method of processing fluid state plastic and like materials comprising: mixing said fluid state material while advancing it in an axially pulsating stream; dividing off a porton of said stream; introducing said stream and divided off portion to opposing portions of a chamber portion having a radial outlet between its ends downstream from said dividing off point; and maintaining advancing pressures directing said divided off portion and stream together from opposite axial directions at said outlet to cause said material to be discharged radially from said outlet in a steady stream.

19. The method of claim 18 wherein the flow of the divided off portion is selectively restricted to create the desired back pressure condition.

20. A method of processing fluid state synthetic plastic material comprising: maintaining a pressure advancing said fluid state material in a generally axial stream; dividing off a flow from said stream; introducing said stream to a chamber portion having a side discharge orifice downstream from said dividing location; maintaining a pressure advancing the stream in a direction toward the orifice; and introducing said flow to said chamber portion on the opposite side of said orifice and maintaining an advancing pressure in the opposite direction forcing said stream and flow together and discharging said rejoined stream and flow out said orifice in a steady stream.

21. The method of claim 20 in which both said stream and flow are separately mixed in said chamber portion on their way to said discharge orifice.

References Cited

UNITED STATES PATENTS

| | | | |
|---|---|---|---|
| 187,153 | 2/1877 | Lyman | 103—92 |
| 1,128,043 | 2/1915 | Quigley | 222—413 |
| 2,067,583 | 1/1937 | Stark | 222—404 X |
| 2,628,002 | 2/1953 | Peterson | 222—412 |
| 2,658,604 | 11/1953 | Erdmenger et al. | 222—88 |
| 2,704,516 | 3/1955 | Mock et al. | 103—88 |
| 2,920,347 | 1/1960 | Joukainen et al. | 103—88 X |

ROBERT B. REEVES, *Primary Examiner.*

HADD S. LANE, *Examiner.*